2,989,401
METHOD OF REDUCING MOISTURE LOSS FROM FROZEN MEAT
Thomas Reid Anderson, Walnut Creek, Calif.
(4605 Gould Ave., La Canada, Calif.)
No Drawing. Filed Feb. 2, 1959, Ser. No. 790,363
2 Claims. (Cl. 99—169)

This invention relates to an improved process for reducing moisture loss from frozen meat.

The applicant's copending application Serial No. 754,700, filed August 13, 1958, now Patent No. 2,948,623, which is a continuation-in-part of an earlier filed application reveals that certain film-forming fatty materials such as cetyl alcohol (hexadecanol), arachidic acid, and octadecanol form a thin film, believed to be monomolecular in thickness, on meat which significantly slows the loss of moisture from the treated meat.

It has now been found that the usefulness of the fatty film on frozen meat may be improved by first coating the meat with ice and then forming the moisture retarding fatty film on that ice. It is now believed that the fatty film, when used on frozen meat, to be effective, or at least to be most efficient, requires the continued existence of an ice layer intermediately disposed of the meat and the fatty film itself. An ice layer is seemingly necessary to the proper alignment or orientation of the fatty molecules making up the monomolecular film. By first coating the meat with ice and then forming the fatty film, there is provided a considerable reserve of the necessary material, namely, water, needed for prolonging the effectiveness of the film. Where the fatty film has been formed by the simple application of an aqueous dispersion of the fatty material to the meat (without first forming an ice coating) the underlying ice is apparently made up of the water of the originally applied aqueous dispersion and that water migrating into it from the meat. When the water available from these sources has been lost by sublimation through the fatty film to the atmosphere, the monomolecular film then becomes much less effective in retarding further sublimation of moisture from the meat.

The ice glaze or coating may be formed by either spraying or dipping of the meat in water. In the instance where the ice coating is a lamination of ice layers, the lamination is built up through the multiple applications of water with each application followed by a freezing before the meat is again dipped or sprayed. In some instances, it may be profitable to freeze a block of ice around the meat.

The process of the invention is particularly applicable to the protection of poultry including ducks, turkeys, chickens and to the reduction of moisture loss from fish and sea foods.

Moisture loss from frozen fish may adversely affect its quality. Freezer burn caused by intense local drying in cold storage results in an objectionable whitened and wrinkled condition. With prolonged storage, the drying may extend to the interior of the fish so that the flesh becomes loose and inelastic. The process of the instant invention will greatly reduce shrinkage and freezer burn.

The moisture retarding film is formed of a saturated aliphatic compound having the formula R—OH, R—COOH, where R is an aliphatic radical having at least 11 carbon atoms. Ethyl stearate may also be used. The fatty compound may be applied in the form of an aqueous dispersion, for example, an emulsion of the fatty material in water. The aqueous dispersion may be prepared by dissolving the fatty material in the water with the aid of a readily volatile solvent, such as ethyl alcohol. The suitable materials are, for the most part, waxy, crystalline flakes or needles of high melting points which cannot be satisfactorily applied to the meat, except through a dispersion, to form the necessary thin film.

The fatty alcohols and fatty acids of the foregoing formulae vary considerably in their effectiveness in the process of the invention. Among the preferred materials are the fatty acids and alcohols having from 16 to 20 carbon atoms inclusive or mixtures of those materials. The $C_{16}$–$C_{20}$ materials will generally be found to provide the greatest resistance to water evaporation. Particularly suitable compounds include octadecanol, hexadecanol (commonly known as cetyl alcohol), stearic acid (octadecanoic acid) and arachidic acid (eicosanoic acid).

Other fatty acids that may be employed include lauric, tridecoic, myristic, palmitic, margaric acids and the higher fatty acids, such as carnaubic acid and carboceric acid. The corresponding alcohols, for example, dodecanol, tridecanol, carnaubyl alcohol and ceryl alcohol may be used, but generally, the fatty acids and alcohols, below the $C_{16}$–$C_{20}$ carbon range are less effective than those of that preferred range. Dodecanol (the $C_{12}$ alcohol), for example, offers a relatively low resistance to moisture evaporation.

The aqueous emulsion may be prepared in the following manner. Equal weights of hexadecanol (or other suitable fatty material) and any of certain edible emulsifying agents are mixed together, after first heating both the emulsifying agent and the hexadecanol to a temperature in excess of 49° C. The warm mixture is then agitated with water in a mechanical shaker or a blender until the hexadecanol is placed in aqueous emulsion. In an alternative, the emulsifier may be added to the warm water and then heated fatty material introduced and the mixture shaken to form the emulsion. There are many emulsifiers suitable for use; among these are the edible partial fatty esters of polyhydric alcohols, including propylene glycol and glycerol. The suitable emulsifiers include monoglycerides, diglycerides and mixtures thereof. A preferred emulsifier contains approximately 40% monoglyceride, 40% diglyceride and 20% triglyceride and may be prepared by reacting glycerol with various animal and vegetable fats, such as lard and cottonseed oil. An esterified mixture of lactic acid and glycerol may also be employed.

The fatty acid, alcohol or ethyl stearate may be applied in water dispersion of remarkably low concentrations. Concentrations of 30–1000 parts of the fatty material per million (p.p.m.) of water have profitably been employed. However, dispersions of greater and less concentrations may be employed, depending on the particular material used.

*Example*

Four lots of trout of three fish each were handled in the following fashion. The four lots were held in storage for 30 days at the subfreezing temperature of 10° F. Lot A was untreated and at the end of the test period evidenced an average shrinkage of 2.6%. Lot B before freezing was immersed in an aqueous dispersion of 50 p.p.m. concentration of cetyl alcohol. Lot B showed an average shrinkage of 1.1%. The fish of Lot C were protected by an ice glaze formed by two separate immersions of the fish in water. The first immersion was followed by freezing before the second application of water. Lot C experienced an average shrinkage of 2.0%. Lot D was treated as Lot C except that the fish for their second immersion was dipped in an aqueous cetyl alcohol dispersion (50 p.p.m.), rather than in pure water. The fish of Lot D showed an average shrinkage of 0.3%.

I claim as my invention:

1. An improved method for reducing moisture loss from frozen meat comprising coating the meat with ice and forming on the ice coated meat a moisture-retarding film of a saturated fatty compound selected from the group consisting of ethyl stearate and the fatty compounds having the formulae of R—OH and R—COOH where R is an aliphatic radical having at least 11 carbon atoms said fatty compound being present in an amount sufficient to form said moisture-retarding film.

2. A process in accordance with claim 1 wherein the ice coating is a lamination built up through the multiple applications of water.

References Cited in the file of this patent

UNITED STATES PATENTS

| | | |
|---|---|---|
| 1,996,392 | Torrence et al. | Apr. 2, 1935 |
| 2,214,398 | Bedford | Sept. 10, 1940 |
| 2,793,123 | Haas | May 21, 1957 |
| 2,876,109 | Hemery et al. | Mar. 3, 1959 |